United States Patent
Liu et al.

(10) Patent No.: US 11,773,220 B2
(45) Date of Patent: Oct. 3, 2023

(54) ANTIBACTERIAL POLYMER AND PREPARATION METHOD THEREOF

(71) Applicant: Guilin Zheqi Technology Co., Ltd, Guilin (CN)

(72) Inventors: Jixiang Liu, Guilin (CN); Yunrui Zhao, Guilin (CN); Yucong Li, Guilin (CN)

(73) Assignee: Guilin Zheqi Technology Co., Ltd, Guilin (CN)

( * ) Notice: Subject to any disclaimer, the term of this patent is extended or adjusted under 35 U.S.C. 154(b) by 275 days.

(21) Appl. No.: 17/281,527

(22) PCT Filed: Sep. 19, 2019

(86) PCT No.: PCT/CN2019/106766
§ 371 (c)(1),
(2) Date: Mar. 30, 2021

(87) PCT Pub. No.: WO2020/073784
PCT Pub. Date: Apr. 16, 2020

(65) Prior Publication Data
US 2022/0041808 A1     Feb. 10, 2022

(30) Foreign Application Priority Data
Oct. 10, 2018 (CN) .......................... 201811179913.9

(51) Int. Cl.
*C08G 73/02*     (2006.01)
*C08G 85/00*     (2006.01)

(52) U.S. Cl.
CPC ....... *C08G 73/0213* (2013.01); *C08G 85/004* (2013.01)

(58) Field of Classification Search
None
See application file for complete search history.

(56) References Cited

U.S. PATENT DOCUMENTS

2006/0127457 A1*   6/2006   Buchalter ............. D06M 16/00
                                             424/443

FOREIGN PATENT DOCUMENTS

| CN | 1350022 A | 5/2002 |
| CN | 1111556 C | 6/2003 |
| CN | 105315459 A | 2/2016 |
| CN | 106075577 A | 11/2016 |
| CN | 109208174 A * | 1/2019 |
| CN | 109467698 A | 3/2019 |
| CN | 109535418 A | 3/2019 |
| CN | 109535571 A | 3/2019 |
| KR | 20070071755 A | 7/2007 |
| WO | 2011043690 A1 | 4/2011 |

* cited by examiner

*Primary Examiner* — Tae H Yoon
(74) *Attorney, Agent, or Firm* — Bayramoglu Law Offices LLC

(57) ABSTRACT

An antibacterial polymer and a preparation method thereof are provided. The antibacterial polymer is obtained by polymerization of a polyol and a guanidine salt, and has the following structure:

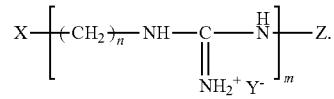

In the preparation method, non-toxic and non-irritating polyols are used as raw materials, wherein the non-toxic and non-irritating polyols are friendly to an environment and a human body.

4 Claims, No Drawings

ANTIBACTERIAL POLYMER AND PREPARATION METHOD THEREOF

CROSS REFERENCE TO THE RELATED APPLICATIONS

This application is the national stage entry of International Application No. PCT/CN2019/106766, filed on Sep. 19, 2019, which is based upon and claims priority to Chinese Patent Application No. 201811179913.9, filed on Oct. 10, 2018, the entire contents of which are incorporated herein by reference.

TECHNICAL FIELD

The present application relates to the field of organic synthesis and environmental protection. Specifically, the present application provides an antibacterial polymer formed by polymerization of a non-toxic/non-irritating polyol and a guanidine salt and a preparation method of the antibacterial polymer.

BACKGROUND

Compared with natural materials, chemical materials such as plastics and chemical fibers have the advantages of long life, stable properties, simple manufacture, light weight, and non-hygroscopicity. Therefore, they become regular raw materials for the manufacture of various daily supplies and clothing. The above-mentioned chemical materials are commonly used in bathrooms, kitchens, bags, clothing, etc., where they are relatively rich in humidity, heat, and organic matter, thus forming an environment that microorganisms are easy to breed. Therefore, it is often necessary to add antibacterial agents to these materials to form antibacterial materials.

Among the commonly used plastic antibacterial agents, natural antibacterial agents cannot be widely used due to price and stability. Inorganic antibacterial agents are mainly metal ions such as silver ions and zinc ions supported on zeolite, such that the resulting products are often unstable in performance due to the complex preparation process, and often have defects in anti-fungal properties. Organic antibacterial agents mainly include quaternary ammonium salts, ethers, phenols, thiazoles, diphenyl ether compounds, etc., and have fast sterilization speed and broad antibacterial spectrum, but their heat and water resistance and chemical resistance are poor, such that the resulting product has a short antibacterial validity period. The above-mentioned problems are particularly noticeable when such organic antibacterial agents are used for materials such as clothing, daily containers and pipelines that frequently contact with washing, detergents, and hot water.

The inventors previously obtained an antibacterial masterbatch by polymerization of polyamines and guanidine salts and obtained a Chinese patent CN1111556C. In subsequent applications, the masterbatch was actually used in plastics, fibers, coatings, etc., and achieved a good practical effect. Although this masterbatch has a good anti-mildew effect, it has the problem of insufficient water resistance and washing resistance like most organic antibacterial agents (the water solubility of the guanidine structure makes this problem more significant), and the existing antibacterial masterbatches, including the masterbatch in CN1111556C, mostly include toxic/irritating raw materials such as polyamines. The waste water is not good for environmental protection, and the possible residues on the product are irritating to human skin. Therefore, there is a need for further improvement of polymer antibacterial agents containing a guanidine structure.

SUMMARY

In response to the above problems, the inventors further improve a polymer antibacterial agent containing a guanidine structure in CN1111556C, and prepare a novel antibacterial polymer by polymerization of polyols and guanidine salts. This polymer maintains antibacterial properties similar to the antibacterial polymer in CN1111556C, and meanwhile achieves a significant improvement in heat resistance, water resistance, and detergent resistance, making it more suitable for the preparation of plastic and fiber materials that are often exposed to water and detergent; and non-toxic/non-irritating polyols are used as raw materials, which are more friendly to environment and human body than polyamines.

The basic principle of the reaction is as follows:

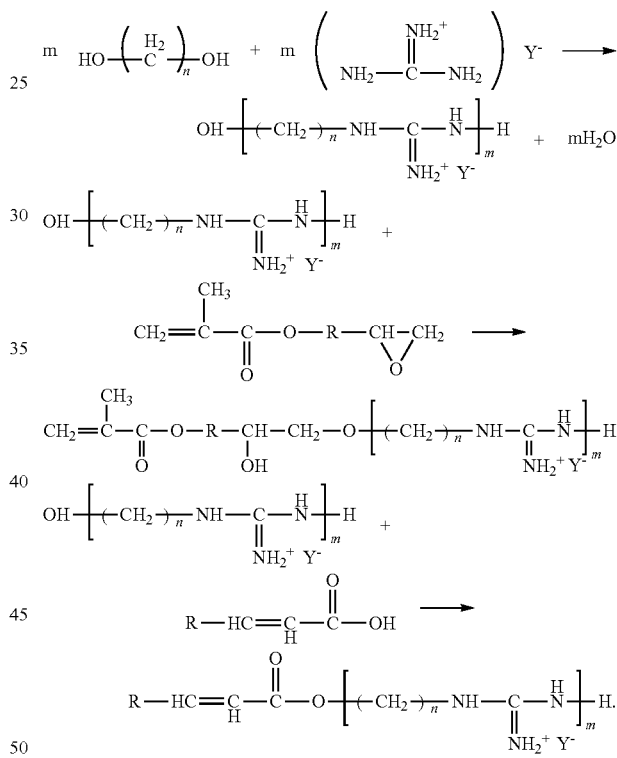

In one aspect, the present application provides an antibacterial polymer, which is formed by polymerization of a polyol or polyamine with a guanidine salt.

Furthermore, the antibacterial polymer is formed by polymerization of the polyol and the guanidine salt, and has the following structure:

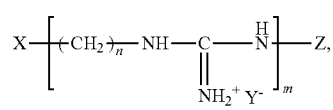

wherein n=5-10, m=50-150; $Y^-$ is selected from $Cl^-$, $NO_3^-$, $HCO_3^-$, $CH_3COO^-$, $HSO_4^-$ or $H_2PO_4^-$ anion; X is a C5-C20 ester group or ether group containing 1-5 active unsaturated double bonds; and Z is H or X.

Furthermore, in the antibacterial polymer, X is selected from an acrylate group, a methacrylate group, a crotonate group, an undecenoate group, an ethyl acrylate group, a propyl acrylate group or a hydroxypropyl methacrylate group.

In another aspect, the present application provides a preparation method of the antibacterial polymer. The preparation method includes: mixing a polyol and a guanidine salt in a molar ratio of 1:(0.8-1.8); adding the resultant to a reactor, adjusting the pH to acidity under the protection of nitrogen, heating to 120-180° C., and reacting for 1-4 hours; then, adding a C3-C20 compound containing active unsaturated double bonds with 5% to 25% by weight of the polyol and guanidine salt; performing an esterification reaction or ring-opening condensation reaction; and terminating the reaction after 10-120 minutes.

Furthermore, a molar ratio of the polyol to the guanidine salt is 1:(1-1.5).

Furthermore, the polyol is selected from a group consisting of ethylene glycol, propylene glycol, butylene glycol, pentylene glycol, 1,6-hexanediol, and 1,10-decanediol; the guanidine salt is selected from a group consisting of guanidine carbonate, guanidine hydrochloride, guanidine nitrate, guanidine sulfate, guanidine phosphate, and guanidine acetate; the C3-C20 compound containing reactive unsaturated double bonds is selected from a group consisting of acrylic acid, methacrylic acid, epoxyethyl acrylate, epoxypropyl acrylate, epoxybutyl acrylate, epoxypropyl methacrylate, epoxyethyl methacrylate, epoxybutyl methacrylate, methyl methacrylate, ethyl methacrylate, butyl acrylate, ethyl acrylate, 2-hydroxyethyl acrylate, 2-hydroxypropyl acrylate, epoxypropyl methacrylate, 2-hydroxypropyl methacrylate, maleic anhydride, fumarate, and itaconic acid.

Furthermore, the preparation method specifically includes:

taking 124 g of ethylene glycol and 260 g of guanidine nitrate and adding to a reactor, mixing evenly, and adjusting pH to 5 with hydrochloric acid under the protection of nitrogen; heating the resultant to 120° C., and reacting for 3 h; then adding 30 g of acrylic acid, and performing an esterification reaction for 1 h; and then terminating the reaction.

Furthermore, the preparation method specifically includes:

taking 152 g of propylene glycol and 254 g of guanidine carbonate and adding to the reactor, mixing evenly, and adjusting pH to 4 with hydrochloric acid under the protection of nitrogen; heating the resultant to 130° C., and reacting for 2.5 h; then adding 25 g of methacrylic acid, and performing an esterification reaction for 1.5 h; and then terminating the reaction.

Furthermore, the preparation method specifically includes:

taking 118 g of 1,6-hexanediol and 100 g of guanidine hydrochloride and adding to the reactor, mixing evenly, and adjusting pH to 3 with hydrochloric acid under the protection of nitrogen; heating the resultant to 150° C., and reacting for 2 h; then adding 20 g of epoxypropyl acrylate, and performing an etherification reaction for 2 h; and then terminating the reaction.

DETAILED DESCRIPTION OF THE EMBODIMENTS

Example 1 Preparation of Antibacterial Masterbatch of the Present Application 1.1 124 g of ethylene glycol and 260 g of guanidine nitrate are taken and added to a reactor and mixed evenly. pH is adjusted to 5 with hydrochloric acid under the protection of nitrogen. The resultant is heated to 120° C., reacted for 3 h, then added with 30 g of acrylic acid. An esterification reaction is performed for 1 h, and then the reaction is terminated. The product is granulated.

The molecular weight of the product is about 8,300, the thermal decomposition temperature thereof is about 340° C., and the infrared spectrum thereof shows a desired characteristic absorption peak.

1.2 118 g of 1,6-hexanediol and 100 g of guanidine hydrochloride are taken and added to the reactor, and mixed evenly. pH is adjusted to 3 with hydrochloric acid under the protection of nitrogen. The resultant is heated to 150° C., reacted for 2 h, then added with 20 g of epoxypropyl acrylate. An etherification reaction is performed for 2 h, and then the reaction is terminated. The product is granulated.

The molecular weight of the product is about 11,500, the thermal decomposition temperature thereof is about 360° C., and the infrared spectrum thereof shows a desired characteristic absorption peak.

1.3 152 g of propylene glycol and 254 g of guanidine carbonate are taken and added to the reactor and mixed evenly. pH is adjusted to 4 with hydrochloric acid under the protection of nitrogen. The resultant is heated to 130° C., reacted for 2.5 h, and then added with 25 g of methacrylic acid. An esterification reaction is performed for 1.5 h, and then the reaction is terminated. The product is granulated.

The molecular weight of the product is about 10,600, the thermal decomposition temperature is about 300° C., and the infrared spectrum shows a desired characteristic absorption peak.

Example 2 Preparation of PPR Injection Molding Material Using the Antibacterial Masterbatch of the Present Application The specific preparation of the injection molding material is completed by the cooperative enterprise. The antibacterial masterbatch of CN1111556C is prepared according to Example 1 in the publication. The antibacterial masterbatch of the present application is prepared according to the method of Example 1. PP-R resin raw material particles, methyl phenyl silicone oil, polypropylene wax (molecular weight 12,000), and talc powder (3,000 mesh) are all conventional types purchased from Ningbo Zhenhai Best Plastics Co., Ltd. and Shanghai Yuxi Industrial Co., Ltd. An injection molding machine is a Yujiang YJ88 horizontal injection molding machine.

Material 1: every 100 parts by weight of PPR particles are added with 3 parts by weight of the antibacterial masterbatch of the present application (1.1), 0.2 part by weight of methyl phenyl silicone oil, 0.3 part by weight of polypropylene wax, and 1 part by weight of talc powder;

Material 2: every 100 parts by weight of PPR particles are added with 5 parts by weight of the antibacterial masterbatch of the present application (1.1), 0.2 part by weight of methyl phenyl silicone oil, 0.3 part by weight of polypropylene wax, and 0.7 part by weight of talc powder;

Material 3: every 100 parts by weight of PPR particles are added with 1 part by weight of the antibacterial masterbatch of the present application (1.2), 0.3 part by weight of methyl phenyl silicone oil, 0.5 part by weight of polypropylene wax, and 1 part by weight of talc powder;

Material 4: every 100 parts by weight of PPR particles are added with 3 parts by weight of the antibacterial masterbatch of CN1111556C, 0.2 part by weight of methyl phenyl silicone oil, 0.3 part by weight of polypropylene wax, and 1 part by weight of talc powder;

Material 5: no antibacterial masterbatch is added.

The specific preparation process is as follows: PPR resin raw material particles are added into a mixer, and then added with methyl phenyl silicone oil at 200 rpm; the resultant is continually mixed for 5 minutes, and then added with talc powder, polypropylene wax and optional antibacterial masterbatch of the present application/CN1111556C; the resultant is continually mixed for 5 minutes and then introduced into the injection molding machine, so as to prepare the antibacterial injection molding material (the operating temperatures of four regions of the injection molding machine are about 200° C., 210° C., 220° C., 210° C.).

TABLE 1

The main properties of the prepared materials

| Sample No. | Relative Density | Tensile strength MPa | Elongation at break % | Flexural strength MPa | Vicat softening point (1 kg, 120° C./h) |
|---|---|---|---|---|---|
| Material 1 | 0.905 | 36.2 | 430 | 26.7 | 153 |
| Material 2 | 0.899 | 36.5 | 430 | 27.2 | 151 |
| Material 3 | 0.907 | 35.2 | 410 | 25.4 | 153 |
| Material 4 | 0.908 | 35.7 | 400 | 25.8 | 152 |
| Material 5 | 0.905 | 36.4 | 410 | 25.2 | 150 |

In order to test the eat water resistant an detergent resistant performances of the anti-bacterial injection molding material of the present application, the materials 1 to 5 are further processed:

Material 1-1: a plastic sheet of Material 1 is added to a drum-type washing machine with the recommended amount of laundry detergent (Blue Moon, fragrance-free), washed for 50 times under a normal procedure at 40° C. (about 1 hour each time), rinsed well, and dried;

Material 2-1: a plastic sheet of Material 2 is added to the drum-type washing machine with a recommended amount of laundry detergent (Blue Moon, fragrance-free), washed for 50 times under a normal procedure at 40° C. (about 1 hour each time), rinsed well, and dried;

Material 3-1: a plastic sheet of Material 3 is added to the drum-type washing machine with a recommended amount of laundry detergent (Blue Moon, fragrance-free), washed for 50 times under a normal procedure at 40° C. (about 1 hour each time), rinsed well, and dried;

Material 4-1: a plastic sheet of Material 4 is added to the drum-type washing machine with a recommended amount of laundry detergent (Blue Moon, fragrance-free), washed for 50 times under a normal procedure at 40° C. (about 1 hour each time), rinsed well, and dried.

Example 3 Antibacterial Performance Test of Injection Molding Material

The antibacterial performance test is carried out by the Antibacterial Material Testing Center of the Technical Institute of Physics and Chemistry of the Chinese Academy of Sciences. The test is basically conducted according to the National Light Industry Standard QB/T2591-2003 of the People's Republic of China. Bacteria and *Candida albicans* are detected: a sterilized polyethylene thin film is spread to cover a plastic sample, eluted after 24 hours of culture, and counted for viable bacteria after 48 hours of culture (72 hours for *Candida albicans*) according to the method in GB 4789.2, and the antibacterial rate is calculated. Mildew detection is performed: the plastic sheet is spread on a plate medium, and sprayed with a mildew spore suspension evenly, and the coverage area of the grown mildew was tested after 28 days of culture.

Bacterial test objects include: *Staphylococcus aureus* ATCC 6538, and *Escherichia coli* ATCC 2592, and the fungus *Candida Albicans* ATCC 10231 is also added. Mildew test objects include: *Aspergillus niger* ATCC 6275, and *Chaetoomium globsum* ATCC 6205.

TABLE 1

Anti-bacterial/*Candida albicans* performance of injection molding materials

| Sample No. | Antibacterial rate of *Staphylococcus aureus* (%) | Antibacterial rate of *Escherichia coli* (%) | Antibacterial rate of *Candida albicans* (%) |
|---|---|---|---|
| Material 1 | 99.5 | 99.7 | 99.2 |
| Material 2 | 99.1 | 99.9 | 99.2 |
| Material 3 | 98.2 | 97.8 | 99.5 |
| Material 4 | 99.6 | 99.0 | 99.3 |
| Material 5 | No antibacterial effect | No antibacterial effect | No antibacterial effect |
| Material 1-1 | 99.2 | 99.5 | 97.7 |
| Material 2-1 | 99.2 | 99.1 | 98.5 |
| Material 3-1 | 98.0 | 96.1 | 99.0 |
| Material 4-1 | 91.0 | No antibacterial effect | No antibacterial effect |

*Refer to the standard of QB/T2591-2003, 90% or less cannot be referred to as having an antibacterial effect.

TABLE 2

Anti-mildew performance of injection molding materials

| Sample No. | Mildew grade of *Aspergillus niger* | Mildew grade of *Chaetomium globosum* |
|---|---|---|
| Material 1 | Grade 0 | Grade 0 |
| Material 2 | Grade 0 | Grade 0 |
| Material 3 | Grade 0 | Grade 0 |
| Material 4 | Grade 0 | Grade 0 |
| Material 5 | No antibacterial effect | No antibacterial effect |
| Material 1-1 | Grade 0 | Grade 0 |
| Material 2-1 | Grade 0 | Grade 0 |
| Material 3-1 | Grade 0 | Grade 0 |
| Material 4-1 | Grade 1 | No antibacterial effect |

*Coverage area of the grown mildew greater than 10% (Grade 2) cannot be referred to as having an antibacterial effect.

The above test data shows that the antibacterial performance of the antibacterial masterbatch of the present application is basically identical to that of the antibacterial masterbatch of CN111 1556C (the anti-*E. coli* performance is slightly worse under individual conditions), but the property of water and detergent resistance is significantly better than that of the antibacterial masterbatch of CN1111556C. The anti-bacterial and anti-mildew performances have little change after high-intensity hot water and washing treatment. However, the anti-bacterial and anti-mildew performances of the antibacterial masterbatch of CN1111556C has been reduced after hot water treatment, and most of the antibacterial and anti-mildew performances are lost.

Other tests show that the mechanical and antibacterial properties of a plastic material containing the antibacterial masterbatch of Example 1 (1.3) are similar to those containing the antibacterial masterbatch of Example 1 (1.1 and 1.2), and meanwhile, the produced materials have similar abilities of resistance to hot water immersion and washing (complete testing is not conducted in order to save the time and cost).

The above-mentioned properties of the antibacterial masterbatch of the present application make it suitable for preparing injection molding materials, polymer materials, fabrics, non-woven fabrics, films, etc., which can maintain the antibacterial ability well after long-term use/washing.

The injection-molded material products in the above Examples are only exemplarily listed, and the antibacterial effects of other products using the antibacterial masterbatch of the present application, such as various plastic thin films, non-woven fabrics, fabrics, etc., can be reasonably expected from Examples 2 and 3, and these technical solutions are also within the scope disclosed and claimed by the present application.

What is claimed is:

1. An antibacterial polymer obtained by polymerization of a diol having $C_{5-10}$ alkylene group and a guanidine salt, comprising the following structure:

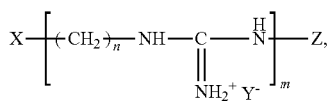

wherein n=5-10, m=50-150;

$Y^-$ is selected from the group consisting of $Cl^-$, $NO_3^-$, $HCO_3^-$, $CH_3COO^-$, $HSO_4^-$ and $H_2PO_4^-$ anion;

X is a C5-C20 ester group or ether group containing 1 active unsaturated double bond; and Z is H.

2. The antibacterial polymer obtained by the polymerization of the diol having $C_{5-10}$ alkylene group and the guanidine salt according to claim 1, wherein the antibacterial polymer is prepared according to the following method:

taking and adding the diol having $C_{5-10}$ alkylene group and guanidine carbonate to a reactor to obtain a resultant mixture, and mixing the resultant mixture evenly, wherein a molar ratio of the diol having $C_{5-10}$ alkylene group to the guanidine carbonate is 1:(1-1.5);

adjusting a pH of the resultant mixture to 4 under a protection of nitrogen; heating the resultant mixture to 130° C., and reacting for 2.5 hours;

then adding methacrylic acid, and performing an esterification reaction for 1.5 hours; and then, terminating the esterification reaction, wherein an amount of the methacrylic acid added is 5-25% by weight of the diol having $C_{5-10}$ alkylene group and the guanidine carbonate.

3. An antibacterial polymer obtained by the polymerization of the diol having $C_{5-10}$ alkylene group and the guanidine salt according to claim 1, wherein the antibacterial polymer is prepared according to the following method:

taking and adding 118 g of 1,6-hexanediol and 100 g of guanidine hydrochloride and adding to a reactor to obtain a resultant mixture, and mixing the resultant mixture evenly;

adjusting a pH of the resultant mixture to 3 under a protection of nitrogen; heating the resultant mixture to 150° C., and reacting for 2 hours;

then adding 20 g of epoxypropyl acrylate, and performing an etherification reaction for 2 hours; and then, terminating the etherification reaction.

4. The antibacterial polymer obtained by the polymerization of the diol having $C_{5-10}$ alkylene group and the guanidine salt according to claim 1, wherein the antibacterial polymer is prepared according to the following method:

taking and adding 124 g of the diol having $C_{5-10}$ alkylene group and guanidine nitrate to a reactor to obtain a resultant mixture, and mixing the resultant mixture evenly, wherein a molar ratio of the diol having $C_{5-10}$ alkylene group to the guanidine nitrate is 1:(1-1.5);

adjusting a pH of the resultant mixture to 5 under a protection of nitrogen;

heating the resultant mixture to 120° C., and reacting for 3 hours;

then adding acrylic acid, and performing an esterification reaction for 1 hour; and then, terminating the esterification reaction, wherein an amount of the acrylic acid added is 5-25% by weight of the diol having $C_{5-10}$ alkylene group and the guanidine nitrate.

* * * * *